United States Patent
Bui et al.

(10) Patent No.: US 6,285,994 B1
(45) Date of Patent: Sep. 4, 2001

(54) METHOD AND SYSTEM FOR EFFICIENTLY SEARCHING AN ENCODED VECTOR INDEX

(75) Inventors: Thuan Quang Bui, Alameda, CA (US); Randy Lynn Egan; Kevin James Kathmann, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/318,691

(22) Filed: May 25, 1999

(51) Int. Cl.[7] .................................................... G06F 17/30
(52) U.S. Cl. .................. 707/2; 707/101; 707/4; 707/5
(58) Field of Search ............................ 707/2, 100, 101, 707/3–5, 1

(56) References Cited

U.S. PATENT DOCUMENTS

| | | | |
|---|---|---|---|
| 4,727,354 | 2/1988 | Lindsay | 340/347 |
| 5,226,135 | 7/1993 | Mishina et al. | 395/425 |
| 5,287,494 | 2/1994 | Garcia et al. | 395/600 |
| 5,444,488 | 8/1995 | Goubault et al. | 348/414 |
| 5,477,221 | 12/1995 | Chang et al. | 341/51 |
| 5,706,495 | * 1/1998 | Chadha et al. | 707/2 |
| 5,761,652 | * 6/1998 | Wu et al. | 707/2 |
| 5,778,361 | * 7/1998 | Nanjo et al. | 707/5 |
| 5,779,184 | * 8/1998 | Fulton et al. | 707/2 |
| 5,781,128 | 7/1998 | Shlomot | 341/51 |
| 5,822,723 | 10/1998 | Kim et al. | 704/222 |
| 5,963,935 | * 10/1999 | Ozbutun et al. | 707/3 |
| 6,141,656 | * 10/2000 | Ozbutun et al. | 707/3 |
| 6,173,281 | * 1/2001 | Bestgen et al. | 707/7 |

FOREIGN PATENT DOCUMENTS

0446968A2  6/1984  (EP).

OTHER PUBLICATIONS

IBM Technical Disclosure Bulletin, "Means for Updating and Searching Sparse Tables", vol. 32, No. 4A, Sep. 1989.
IBM Technical Disclosure Bulletin, "C++ Data Structures to Support Finite State Machine", vol. 38, No. 12, Dec. 1995.

* cited by examiner

Primary Examiner—John Breene
Assistant Examiner—Debbie Le
(74) Attorney, Agent, or Firm—Sawyer Law Group LLP; Ingrid M. Foerster

(57) ABSTRACT

Method and system aspects for efficiently searching an encoded vector index are provided. The aspects include the translation of a search query into a candidate bitmap, and the mapping of data from the candidate bitmap into a search result bitmap according to entry values in the encoded vector index. Further, the translation includes the setting of a bit in the candidate bitmap for each entry in a symbol table that corresponds to candidate of the search query. Also included in the mapping is the identification of a bit value in the candidate bitmap pointed to by an entry in an encoded vector.

23 Claims, 6 Drawing Sheets

METHOD AND SYSTEM FOR EFFICIENTLY SEARCHING AN ENCODED VECTOR INDEX

FIELD OF THE INVENTION

The present invention relates to encoded vector indices, and more particularly to efficiently searching an encoded vector index.

BACKGROUND OF THE INVENTION

The increased focus on complex queries for data warehousing and OLAP (OnLine Analytical Processing) has resulted in a revival of interest in bitmap indexes. The basic idea behind a bitmap is to use a single bit (instead of multiple bytes of data) to indicate that a specific value of an attribute is associated with an entity. A bit-mapped index is simply a very, very long string of bits, commonly called bit vector or bitmap. Each bit in the bitmap represents each row in a table, and the bit is set to 1 if an associated entry is contained in the list represented; otherwise, the bit is set to 0. The relative position of the bit within the bitmap can be mapped to the relevant record ID of the row in the table.

This technique is particularly attractive when the set of possible values for the index key is small. Input/Output (I/O) is significantly reduced when a large fraction of a large table is represented using bitmap lists. However, when a large number of values exist in an index, it would require large number of bitmaps that are likely to be rather sparse (i.e., very few bits will be 1 in the bitmaps) and would result in heavy storage requirements for storing a lot of zeros.

Therefore, the bit mapped approach is not practical for large dimensions and fact tables. The impracticality leads to a better bitmap schema called Encoded Vector Index (EVI) that retains much of the processing advantages of bit-mapped indexing and can also support very large tables with larger cardinalities. An EVI consists of a Symbol Table and an Encoded Vector. The Symbol Table contains a sorted list of all the distinct values of a column in a table, a unique code assigned for each distinct value, and an occurrence count for each distinct value that indicates the number of rows in the table with that distinct value. The Encoded Vector is an array with a dimension equal to the number of rows in the table. Each entry in the Encoded Vector contains the code from the Symbol Table that corresponds to the value contained in the row of the table.

By way of example, FIG. 1 illustrates a data table 10, Table A, a symbol table 12, and an encoded vector 14. The data table 10 includes data identified in an ID column by appropriate symbols. The symbols include the alphabetic characters 'A', 'E', 'I', 'K' and 'W', as shown in the symbol column of symbol table 12. The associated encoded value for each symbol is also included in the symbol table 12. These encoded values, '0', '1', '2', '3', and '4', are utilized to represent the data in the data table 10 in the encoded vector 14, as shown.

FIG. 2 illustrates a prior art approach to data searching in an environment that utilizes an encoded vector index. When performing a search of the encoded vector index, the process initiates with the receipt of a search query (step 20). The items to be searched, either range or point, are then used in conjunction with the symbol table. Thus, a sequential lookup of the symbol table is performed with each search key to develop a candidate code list (step 22). Then, using the candidate code list, the candidates from the candidate code list are compared with each entry in the encoded vector (step 24). When any one of the candidates in the candidate code list matches the entry data of the encoded vector, a bit is set in a temporary bitmap (step 26). The temporary bitmap provides the results to the search query over the entire encoded vector.

To illustrate the prior art approach, the following search query is presented and performed using the example data table 10, symbol table 12, and encoded vector 14 from FIG. 1:

Select * from TableA
where 'A'<=TableA.Key<='F' OR
  TableA.Key='J' OR
  Table A.Key='K'

The resultant candidate code list 28 is shown in FIG. 3 and includes the range of values [0,1] and the value '3' in accordance with the encoded values associated with the symbols that match the search query. FIG. 3 further illustrates the use of the candidate code list in conjunction with the encoded vector 14 that results in the temporary bitmap of search results 30. As described above, for each entry in the encoded vector 14, the entire candidate code list 28 is compared against each entry to determine whether the entry meets the search criteria. For each entry that does meet the search criteria, a bit is set to a '1' value in the temporary bitmap 30.

While the temporary bitmap does provide sufficient search results, the process of producing the temporary bitmap may be quite time-consuming due to two possible problems. When the search query produces a long list of search keys and the symbol list is long, the sequential process that produces the candidate code list takes a significant amount of time. Further, when the candidate code list is long, the sequential process of comparing each candidate to the encoded v tor entry also takes a significant amount of time.

Accordingly, a need exists for more efficient vector index searching. The present invention addresses such a need.

SUMMARY OF THE INVENTION

The present invention provides a method and system for efficiently searching an encoded vector index. The aspects include the translation of a search query into a candidate bitmap, and the mapping of data from the candidate bitmap into a search result bitmap according to entry values in the encoded vector index. Further, the translation includes the setting of a bit in the candidate bitmap for each entry in a symbol table that corresponds to candidate of the search query. Also included in the mapping is the identification of a bit value in the candidate bitmap pointed to by an entry in an encoded vector.

Through the present invention, scanning of an encoded vector becomes straightforward and fast. For each code in the encoded vector, a simple bit lookup is performed, rather than looping through the entire candidate code list until a match is found. These and other advantages of the aspects of the present invention will be more fully understood in conjunction with the following detailed description and accompanying drawings.

BRIEF DESCRIPTION OF THE DRAWINGS

FIG. 2 illustrates a prior art approach to searching the encoded vector index of

FIG. 1.

DETAILED DESCRIPTION OF THE INVENTION

The present invention relates to efficient encoded vector index searching. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
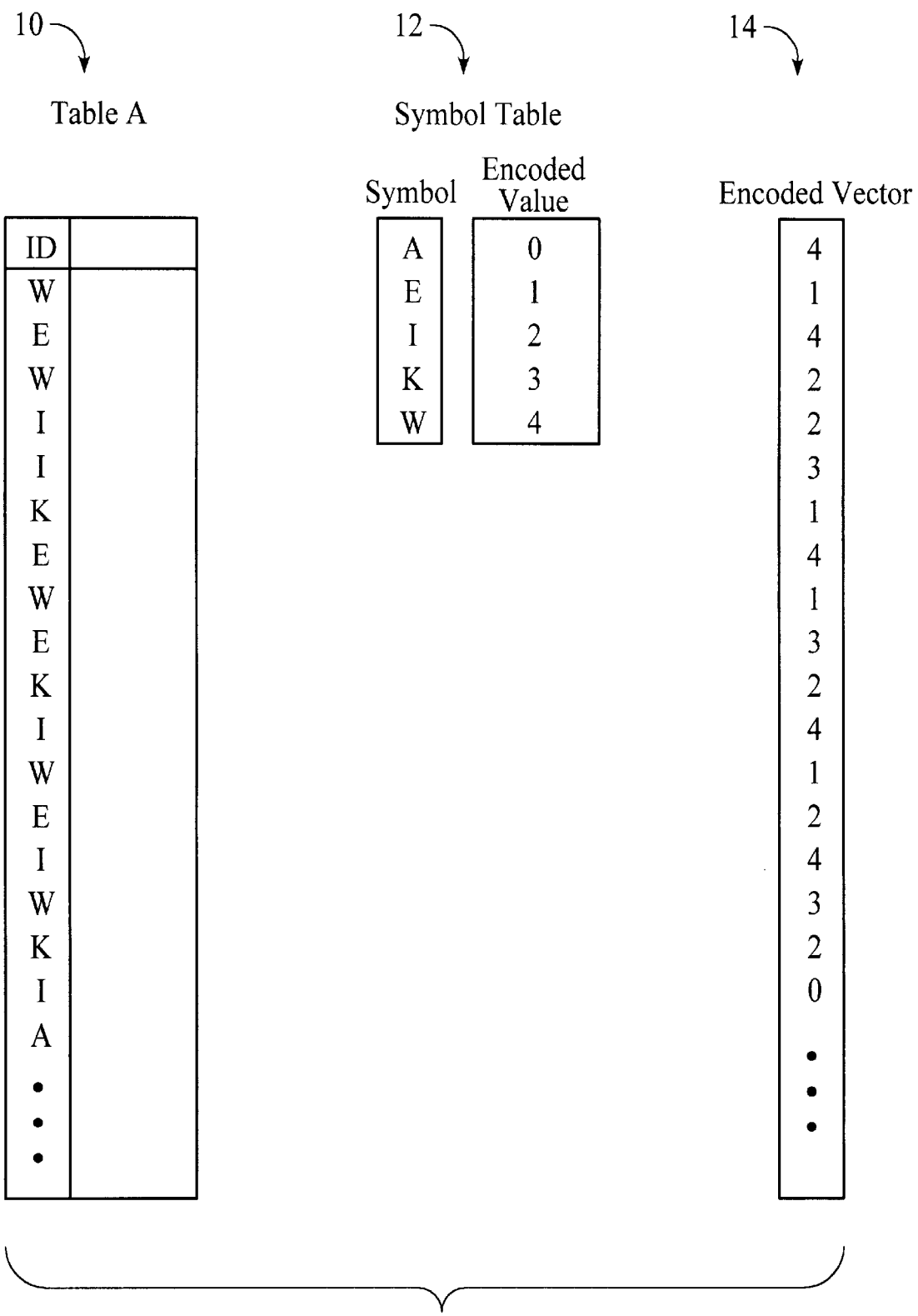
FIG. 1 illustrates an example of a data table, symbol table, and encoded vector.
Figure 2:
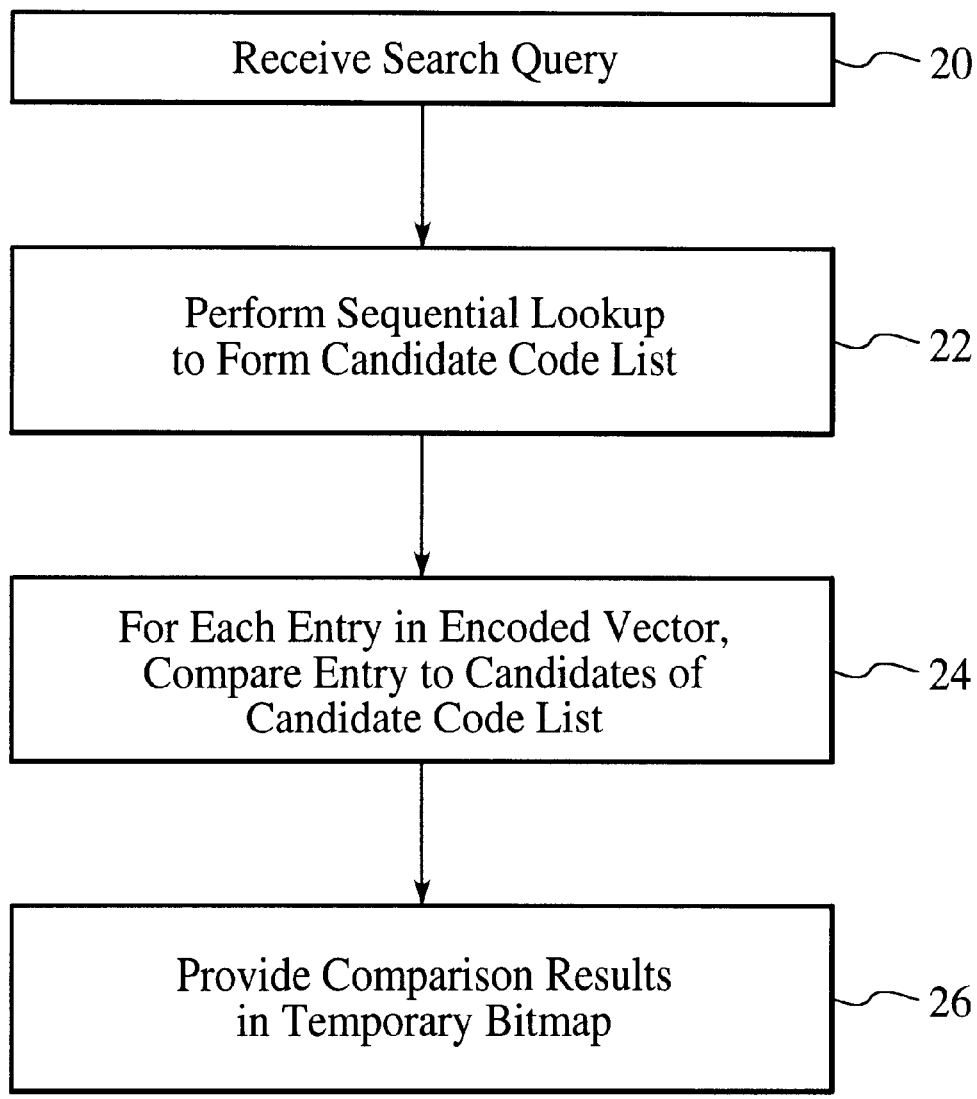
Figure 3:
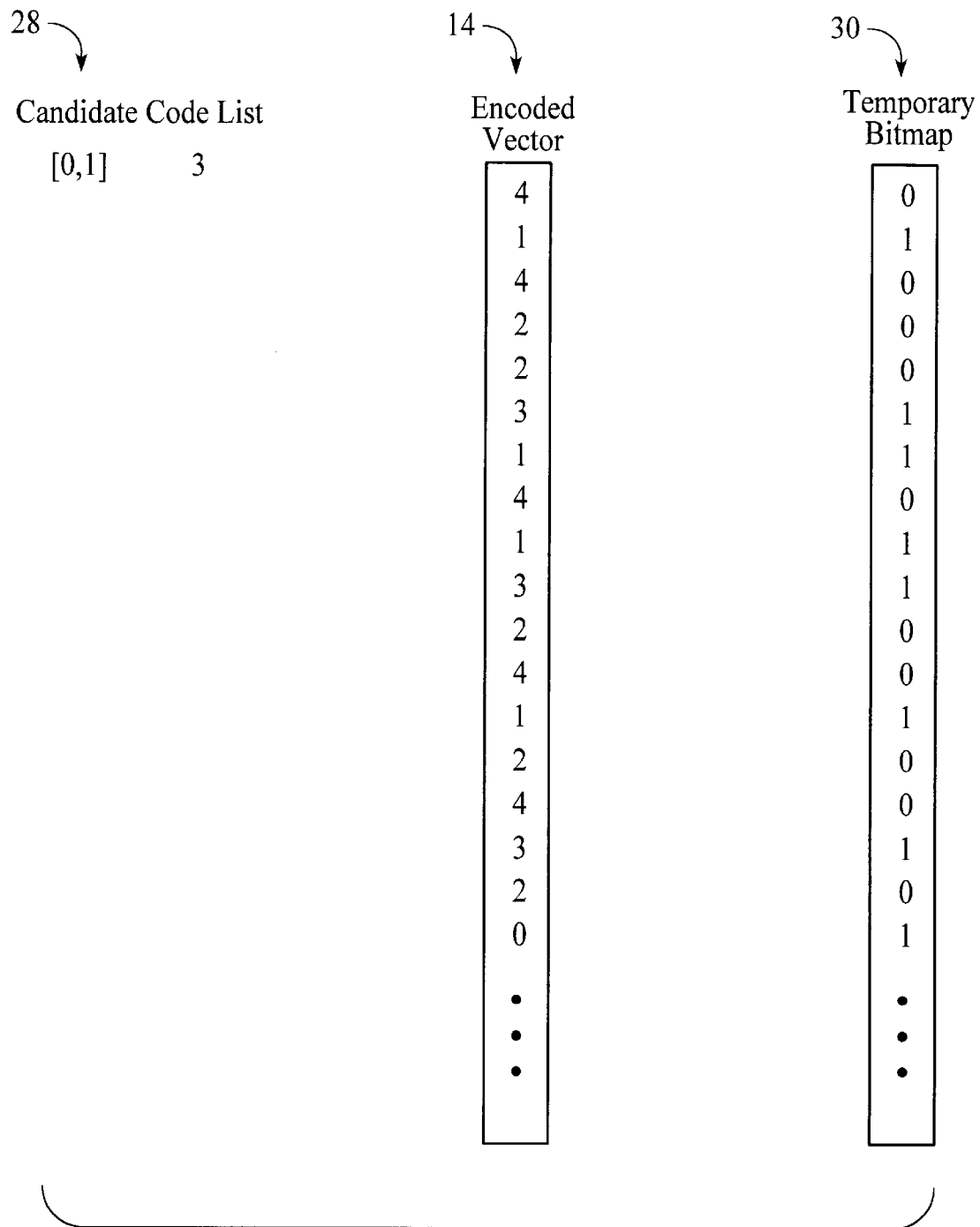
FIG. 3 illustrates a resultant temporary bitmap from an example search of the encoded vector index of FIG. 1 utilizing the approach of FIG. 2.
Figure 4:
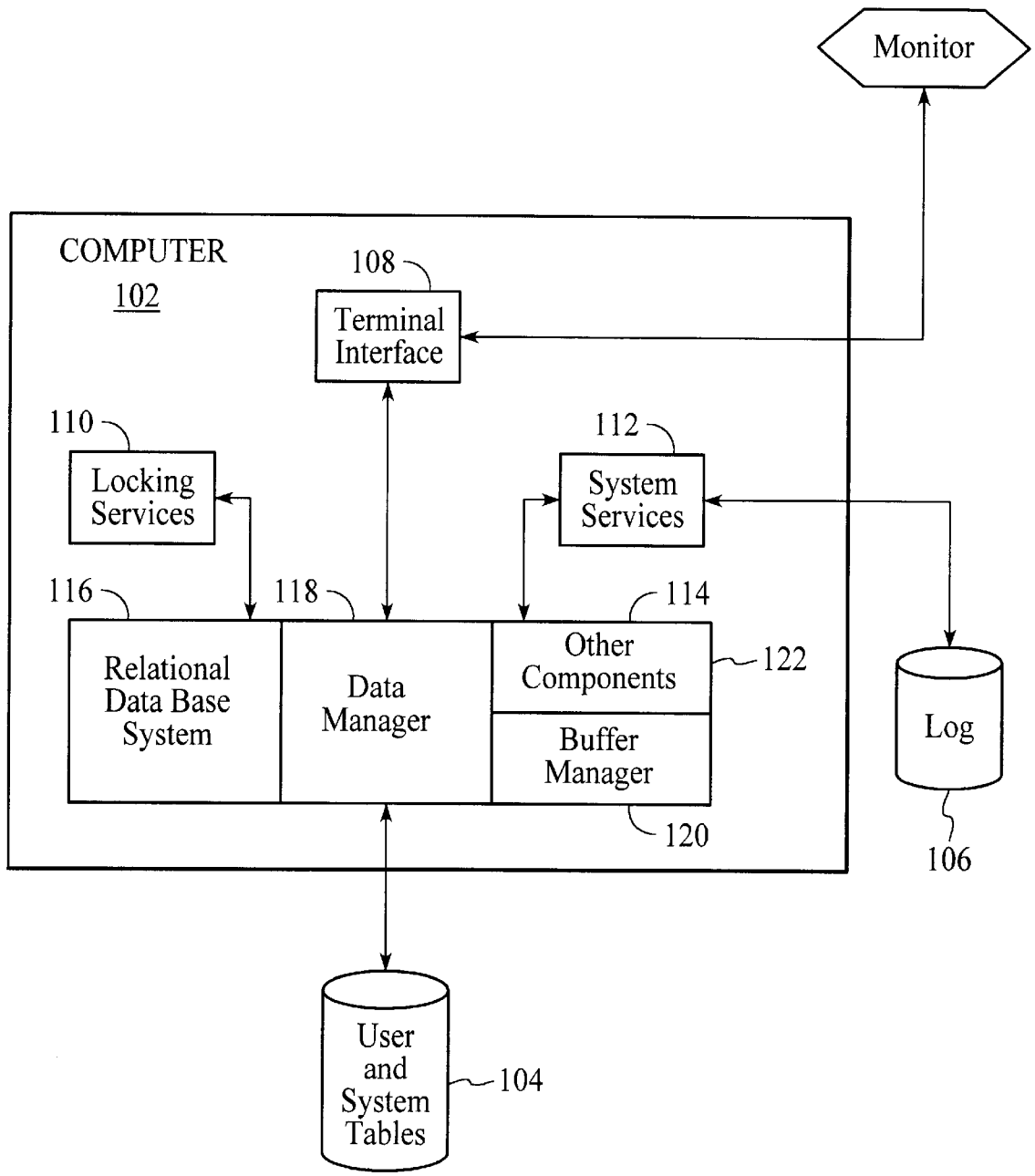
FIG. 4 illustrates a computer system environment in accordance with the present invention.

FIG. 4 illustrates an exemplary computer hardware environment suitable for use with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC, CICS, TSO, OS/2, or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational Database Management System (RDBMS) software. In the preferred embodiment of the present invention, the RDBMS software comprises the DB2 product offered by IBM Corporation for the MVS, AIX, AS/400 or OS/2 operating system. Those skilled in the art will recognize, however, that the present invention has application to any RDBMS software that uses SQL.

As illustrated in FIG. 4, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122, such as an SQL compiler/interpreter. These submodules support the functions of the SQL language, i.e., definition, access control, interpretation, compilation, database retrieval, and update of user and system data.

The present invention is generally implemented using SQL statements executed under the control of the Database Services module 114. The Database Services module 114 retrieves or receives SQL statements, wherein the SQL statements are generally stored in a text file on the data storage devices 104 and 106 or are interactively entered into the computer system 102 by an operator via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g., one or more of the data storage devices 104 and 106. Moreover, the RDBMS software, the SQL statements, and the instructions derived therefrom, are all comprised of instructions, which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of computer system 102 for use during actual operations.

Figure 5:
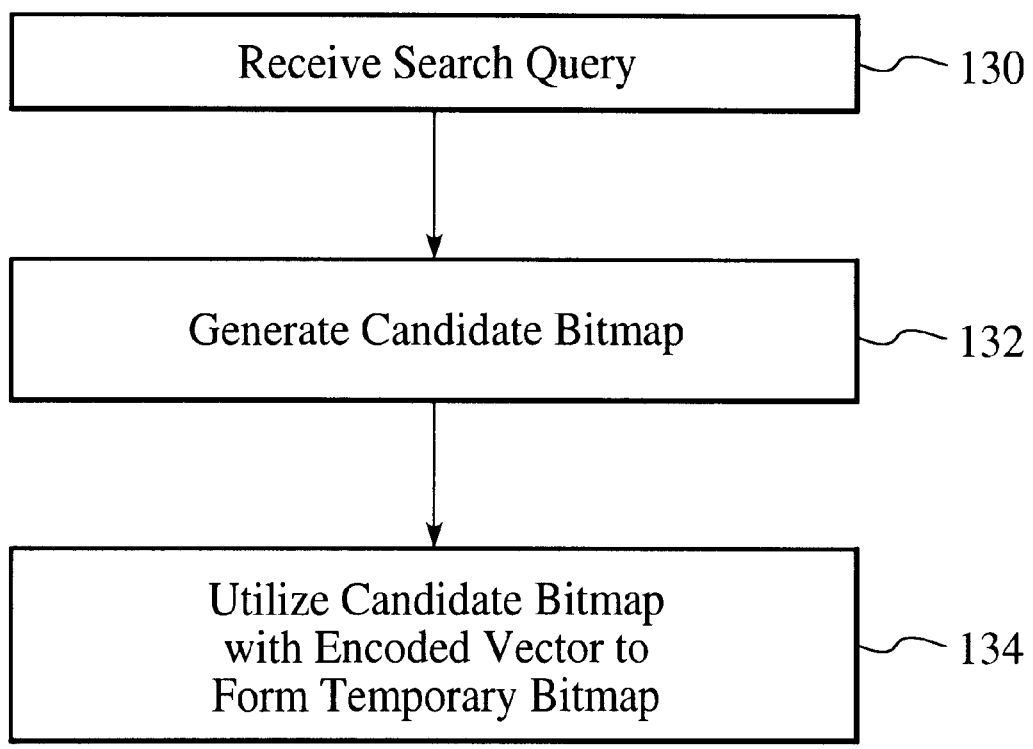
FIG. 5 illustrates encoded vector index searching in accordance with the present invention.

The present invention provides a process for searching an encoded vector index that is less time-consuming than the prior art approach while still producing the desired temporary bitmap result. Referring the block flow diagram of FIG. 5, the process of searching initiates upon receipt of a search query (step 130). A candidate bitmap is then generated (step 132). To generate the candidate bitmap, a bitmap with an equal number of entries to that of the symbol table is created. Each entry in the candidate bitmap contains a '1' or '0' bit value in correspondence with each relative entry in the symbol table and the candidate keys in the search query. Thus, if a current entry in the symbol table is a candidate based on the search query keys, the corresponding bit in the candidate bitmap is set to '1'. The process of generating the candidate bitmap provides even greater efficiency when the candidate keys are broken up into portions that are processed with the symbol table in parallel. Instead of looping sequentially through the key range list, the key range list is split into chunks that can be concurrently processed by multiple tasks. Each task would then set the bit values in the candidate bitmap for the chunk of key ranges for which it is responsible. Once the candidate bitmap is produced, the temporary bitmap is generated based on the encoded vector (step 134). The value of each entry in the encoded vector is used as a pointer to a value in the candidate bitmap. The value at that entry in the candidate bitmap becomes the value for the temporary bitmap entry.

Figure 6:
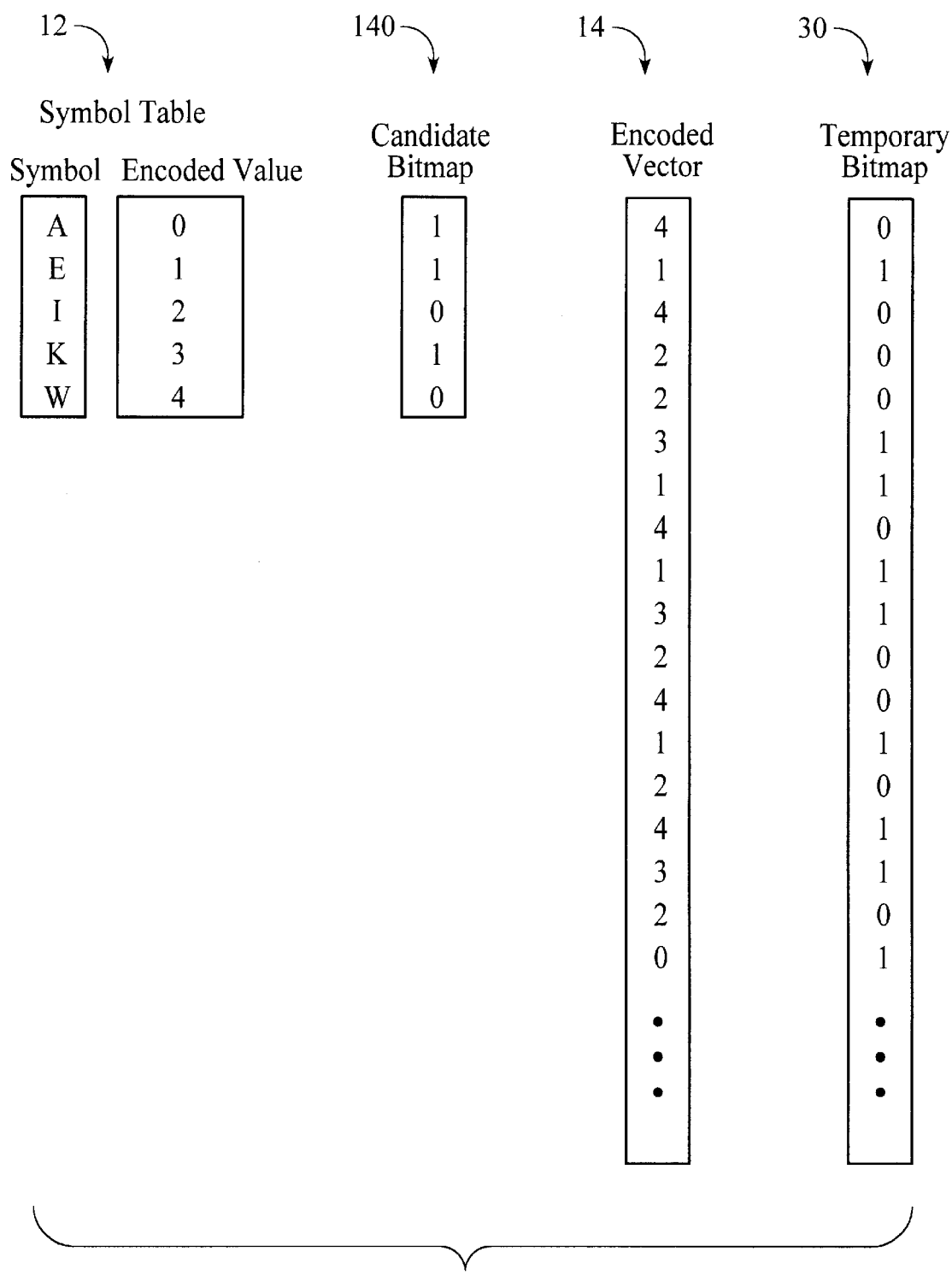
FIG. 6 illustrates a candidate bitmap for the example search query in accordance with the present invention.

By way of example, for the previously presented example search query, a candidate bitmap 140 is produced in accordance with the present invention, as shown in FIG. 6. With five symbols from the symbol table 12, there are five corresponding entries in the candidate bitmap 140. Since the symbols 'A', 'E', and 'K' are candidates, the entries 0, 1, and 3 all contain bit values of '1' in the candidate bitmap. When the encoded vector 14 is utilized with the candidate bitmap 140, the temporary bitmap 30 results in a quick and straightforward manner. Thus, the process of scanning the encoded vector becomes easy. For each code in the encoded vector, a simple bit lookup is performed, rather than looping through the entire candidate code list until a match is found. Significant time is saved through the reduction in scanning time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for efficiently searching an encoded vector index, the method comprising:

translating a search query into a candidate bitmap; and mapping data from the candidate bitmap into a search result bitmap according to entry values in the encoded vector index.

2. The method of claim 1 wherein the step of translating further comprises setting a bit in the candidate bitmap for each entry in a symbol table that corresponds to candidate of the search query.

3. The method of claim 2 wherein the number of entries in the candidate bitmap equals the number of entries in the symbol table.

4. The method of claim 1 wherein the step of mapping further comprises identifying a bit value in the candidate bitmap pointed to by an entry in an encoded vector.

5. The method of claim 4 further comprising entering the identified bit value for each entry of the encoded vector into the search result bitmap.

6. The method of claim 5 wherein the encoded vector and the search result bitmap have an equivalent number of entries.

7. A system for improving encoded vector index searching, the system comprising:

at least one computer processor; and at least one data storage device coupled to the at least one computer processor for storing one or more relational databases that utilize encoded vector indexing and for storing relational database managerial processing instructions, including search query instructions, wherein the at least one computer processor processes the search query instructions by translating a search query into a candidate bitmap, and mapping data from the candidate bitmap into a search result bitmap according to entry values in an encoded vector index.

8. The system of claim 7 wherein the at least one computer processor performs translating by setting a bit in the candidate bitmap for each entry in a symbol table stored in the at least one storage device that corresponds to candidate of the search query.

9. The system of claim 8 wherein the number of entries in the candidate bitmap equals the number of entries in the symbol table.

10. The system of claim 7 wherein the at least one computer processor performs mapping by identifying a bit value in the candidate bitmap pointed to by an entry in an encoded vector.

11. The system of claim 10 wherein the identified bit value for each entry of the encoded vector is entered into the search result bitmap.

12. The system of claim 11 wherein the encoded vector index and the search result bitmap have an equivalent number of entries.

13. A method to improve encoded vector index searching, the method comprising:

generating a candidate bitmap for a search query;

identifying a bit value from the candidate bitmap corresponding to each entry in an encoded vector; and generating a temporary bitmap from the identified bit values as a search result for the search query.

14. The method of claim 13 wherein the step of generating further comprises utilizing a symbol table as a basis for the candidate bitmap.

15. The method of claim 14 wherein the number of entries in the candidate bitmap match the number of entries in the symbol table with each entry in the candidate bitmap corresponding to an entry in the symbol table.

16. The method of claim 14 further comprising setting a bit for an entry in the candidate bitmap for each symbol entry that is a candidate code based on the search query.

17. The method of claim 16 further comprising performing parallel processes to set the bits in the candidate bitmap.

18. A computer readable medium containing program instructions for efficiently searching an encoded vector index comprising:

translating a search query into a candidate bitmap; and mapping data from the candidate bitmap into a search result bitmap according to entry values in the encoded vector index.

19. The computer readable medium of claim 18 wherein the program instruction for translating further comprises setting a bit in the candidate bitmap for each entry in a symbol table that corresponds to candidate of the search query.

20. The computer readable medium of claim 19 wherein the number of entries in the candidate bitmap equals the number of entries in the symbol table.

21. The computer readable medium of claim 18 wherein the program instructions for mapping further comprises identifying a bit value in the candidate bitmap pointed to by an entry in an encoded vector.

22. The computer readable medium of claim 21 further comprising program instructions for entering the identified bit value for each entry of the encoded vector into the search result bitmap.

23. The computer readable medium of claim 22 wherein the encoded vector and the search result bitmap have an equivalent number of entries.

* * * * *